United States Patent [19]

Harry, Sr.

[11] Patent Number: 5,175,200
[45] Date of Patent: Dec. 29, 1992

[54] PHENOLIC HYDRAZINE CONTAINING POLY(ARYLENE SULFIDE) HAVING COMPARATIVE TRACKING INDEX IMPROVEMENT

[75] Inventor: Nathaniel Harry, Sr., Southfield, Mich.

[73] Assignee: Phillips Petroleum Company, Bartlesville, Okla.

[21] Appl. No.: 788,549

[22] Filed: Nov. 6, 1991

[51] Int. Cl.⁵ .............................................. C08K 5/24
[52] U.S. Cl. .................................... 524/194; 524/100; 524/189; 524/191; 524/223; 524/291; 524/333; 524/335; 524/451; 524/609
[58] Field of Search ............... 524/451, 333, 335, 609, 524/324, 189, 223, 191, 194

[56] References Cited

U.S. PATENT DOCUMENTS

| | | | |
|---|---|---|---|
| 3,884,873 | 5/1975 | Short | 260/45.85 B |
| 4,134,874 | 1/1979 | Needham | 260/37 SB |
| 4,176,098 | 11/1979 | Needham | 260/18 R |
| 4,247,598 | 1/1981 | Blackwell | 428/419 |
| 4,304,819 | 12/1981 | Blackwell | 428/419 |
| 4,365,037 | 12/1982 | Adachi et al. | 524/449 |
| 4,489,129 | 12/1984 | Shue et al. | 428/366 |
| 4,504,551 | 3/1985 | Leland | 428/419 |
| 4,529,769 | 7/1985 | Johnson et al. | 524/425 |
| 4,540,538 | 9/1985 | Corwin et al. | 264/211 |
| 4,544,700 | 10/1985 | Wright | 524/543 |
| 4,585,700 | 4/1986 | Johnson et al. | 428/419 |
| 4,871,793 | 10/1989 | Nakahara et al. | 524/335 |

OTHER PUBLICATIONS

A brochure entitled *Irganox MD-1024: Extraction Resistant Antioxidant and Metal Deactivator*, published by Ciba-Geigy.

An article by J. D. Capolupo and T. M. Chucta entitled "Antioxidants," *Modern Plastics Encyclopedia* 1988, pp. 127–128.

*Primary Examiner*—Paul R. Michl
*Assistant Examiner*—Tae H. Yoon
*Attorney, Agent, or Firm*—Laney, Dougherty, Hessin & Beavers

[57] ABSTRACT

The present invention provides: a novel poly(arylene sulfide) (PAS) composition having an increased comparative tracking index (CTI) rating; a novel method wherein the inventive composition is formed and molded to produce a useful article; a novel article produced by the inventive molding method; a novel method wherein the inventive composition is formed and used to encapsulate an article; and a novel encapsulated article produced by the inventive encapsulation method. The inventive PAS composition comprises: poly(arylene sulfide) resin; talc; and an amount of hindered phenol sufficient to increase the composition's CTI rating.

17 Claims, No Drawings

PHENOLIC HYDRAZINE CONTAINING POLY(ARYLENE SULFIDE) HAVING COMPARATIVE TRACKING INDEX IMPROVEMENT

BACKGROUND OF THE INVENTION

In one aspect, the present relates to poly(arylene sulfide) compositions. In another aspect, the present invention relates to methods of preparing articles from poly(arylene sulfide) compositions. In yet another aspect, the present invention relates to articles produced from poly(arylene sulfide) compositions.

Poly(arylene sulfide) (PAS) resins have been used in numerous applications. Due to their thermal stability, chemical resistance, and other desirable properties, PAS resins have been widely used in the production of molding compositions, coating compositions, and encapsulating compositions. Due to their desirable electrical insulating properties, PAS resins have been used in the production of electronic components and in the preparation of compositions for encapsulating electronic components.

The comparative tracking index (CTI) rating of a PAS composition provides a comparative indication of the composition's ability to perform as an electrical insulating material under wet and/or contaminated conditions. In determining the CTI rating of a resin composition, two electrodes are placed on a molded test specimen. A voltage differential is then established between the electrodes while an aqueous ammonium chloride solution is slowly dripped onto the test specimen. The CTI rating of the test specimen is the maximum electrode voltage differential at which, in five consecutive tests, more than 50 drops of the ammonium chloride solution must be applied to the test specimen in order to cause tracking to occur.

A need presently exists, particularly in the electrical appliance industry, for plastic compositions which (1) possess the thermal and chemical resistance characteristics exhibited by PAS resins and (2) have high CTI ratings. In recent years, the appliance industry has actively endeavored to develop appliances which are smaller and which provide greater power output. One of the primary techniques used in the industry to reduce the size of an appliance has been to reduce the amount and/or thickness of insulating material used in the appliance. In order to ensure that sufficient insulating capability is maintained when relatively small amounts and/or thicknesses of the insulating material are used, the insulating material must generally have a high CTI rating.

SUMMARY OF THE INVENTION

The present invention provides: a PAS composition having an increased CTI rating; a novel method wherein the inventive composition is formed and molded to produce a useful article; a novel article produced by the inventive molding method; a novel method wherein the inventive composition is formed and used to produce a useful encapsulated article; and a novel encapsulated article produced by the inventive encapsulation method. The inventive PAS composition comprises: poly(arylene sulfide) resin; talc; and hindered phenol. The amount of hindered phenol used in the inventive composition is an amount sufficient to increase the composition's CTI rating.

The present invention provides PAS compositions and articles which: exhibit high degrees of thermal and chemical resistance; have excellent physical properties and electrical insulation properties; and also have high CTI ratings. The presence of talc in the inventive composition improves the composition's CTI rating and also enhances the composition's dimensional stability and mechanical strength. Additionally, although the precise nature of its operation is unknown, the hindered phenol component of the inventive composition operates synergistically with the talc to further improve the composition's CTI rating. Hindered phenol has not been used heretofore, either with or without talc, as an additive for increasing the CTI rating of a thermoplastic resin.

Other and further objects, features, and advantages of the present invention will be readily apparent to those skilled in the art upon reading the following description of the preferred embodiments.

DESCRIPTION OF THE PREFERRED EMBODIMENTS

The present invention provides: a poly(arylene sulfide) (PAS) composition having an increased CTI rating; a novel method wherein the inventive composition is formed and molded to produce a useful article; a novel article produced by the inventive molding method; a novel method wherein the inventive composition is formed and used to produce a useful encapsulated article; and a novel encapsulated article produced by the inventive encapsulation method. The inventive composition contains PAS resin, talc, and an amount of hindered phenol sufficient to increase the composition's CTI rating. The inventive PAS composition also preferably contains glass fiber. Novel articles provided by the present invention can include electronic components (e.g., bobbins, connectors, coils, relays, etc.) which are at least partially formed from the inventive PAS resin composition, and other electronic components (e.g., capacitors, resistors, integrated circuits, transistors, diodes, triodes, coils, transducers, fuses, rectifiers, etc.) which are encapsulated with the inventive PAS composition.

As used herein and in the claims, the term "poly(arylene sulfide) resin" refers to an arylene sulfide polymer (i.e., a homopolymer, copolymer, terpolymer, etc.), or polymer mixture, composed of the arylene sulfide polymeric repeating units disclosed in U.S. Pat. No. 3,354,129, the entire disclosure of which is incorporated herein by reference. Due to its thermal resistance, chemical resistance, electrical insulating properties, availability, and ease of use, poly(phenylene sulfide) is particularly well suited for use in the present invention. As used herein and in the claims, the term "poly(phenylene sulfide) resin" designates a poly(arylene sulfide) resin, or resin mixture, wherein at least about 90% of the polymeric repeating units are unsubstituted p-phenylene sulfide repeating units of the formula:

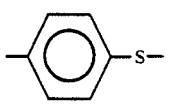

Methods of preparing poly(arylene sulfide) and poly(phenylene sulfide) resins suitable for use in the present invention are disclosed, for example, in U.S. Pat. Nos. 3,354,129; 3,919,177; 4,415,729; and 4,656,231, the entire disclosures of which are incorporated herein by reference.

When the inventive composition is used as a molding composition, the PAS resin used in the inventive composition preferably has a melt flow rate in the range of from about 50 to about 1000 g/10 minutes. When the inventive composition is used as an encapsulating composition, the PAS resin used in the inventive composition preferably has a melt flow rate of at least about 200 g/10 minutes. If the inventive composition is being used to encapsulate very delicate electronic components, the PAS resin used in the inventive composition most preferably has a melt flow rate of at least about 750 g/10 minutes. Unless stated otherwise, all melt flow rates provided herein and in the claims are determined according to ASTM D1238-74 at 343° C. using a 5-kg weight. Curing techniques and other techniques for obtaining desired PAS resin melt flow rates are well known in the art.

Generally, any commercially available talc can be used in the inventive poly(arylene sulfide) composition.

Examples of hindered phenols suitable for use in the inventive composition include: p-hydroxyphenylcyclohexane; di-p-hydroxyphenylcyclohexane dicresylolpropane; tertiary-butyl-p-cresol; 2,6-di-tert-butyl-p-cresol; 2,4,6-tri-tert-butylphenol; octadecyl-3-(3',5'-di-tert-butyl-4'-hydroxyphenyl) propionate (IRGANOX® 1076); tetra kis[methylene 3-(3',5'-tert-butyl-4'-hydroxyphenyl) propionate] methane (IRGANOX® 1010); 1,3,5-trimethyl-2,4,6-tris (3,5-di-tert-butyl-4-hydroxybenzyl) benzene; tris(3,5-di-tert-butyl-4-hydroxybenzyl) isocyanate; 1,3,5-tris(4-tert-butyl-3-hydroxy-2,6-dimethyl benzyl)-1,3,5-triazine-2,4,6-(1H, 3H, 5H)-trione (CYANOX® 1790); bis-[3,3-bis(4'-hydroxy-3'-tert-butyl-phenyl)-butanoic acid]-glycol ester; 2,2'-ethylidene bis (4,6-di-tert-butylphenol) (ISONOX® 129); N,N'-bis[3-3',5'-di-tert-butyl-4-hydroxyphenyl) ] propanylhydrazine (IRGANOX® MD-1024); like compounds; and combinations thereof. The hindered phenol preferred for use in the inventive composition is N,N'-bis[3-(3',5'-di-tert-butyl-4-hydroxyphenyl)] propanylhydrazine (IRGANOX® MD-1024). IRGANOX® MD-1024 is commercially available from Ciba-Geigy Co.

As stated hereinabove, the inventive composition contains poly(arylene sulfide) resin, talc, and an amount of hindered phenol sufficient to increase the composition's comparative tracking index (CTI) rating. The inventive composition preferably contains: from about 30 to about 60 parts by weight PAS resin; from about 25 to about 60 parts by weight talc; and from about 0.5 to about 3.0 parts by weight hindered phenol. These preferred component ranges provide compositions which exhibit high CTI ratings and which are well suited for molding and/or encapsulating. The inventive composition most preferably contains from about 40 to about 50 parts by weight PAS resin; from about 40 to about 50 parts by weight talc; and from about 0.5 to about 1.5 parts by weight hindered phenol.

As also indicated above, the inventive composition preferably contains glass fiber. Incorporating glass fiber in the inventive composition improves the composition's strength, rigidity, toughness, heat resistance, and dimensional stability. If glass fiber is included in the inventive composition, the composition preferably contains: from about 30 to about 60 parts by weight PAS; from about 25 to about 60 parts by weight talc; from about 0.5 to about 3.0 parts by weight hindered phenol; and from about 10 to about 50 parts by weight glass fiber. The glass-filled composition most preferably contains: from about 40 to about 50 parts by weight PAS resin; from about 40 to about 50 parts by weight talc; from about 0.5 to about 1.5 parts by weight hindered phenol; and from about 15 to about 25 parts by weight glass fiber.

The inventive composition also preferably contains a mold releasing agent. The mold releasing agent preferred for use in the inventive composition is high density (i.e., at least about 0.92 g/cc and preferably from about 0.94 to about 0.97 g/cc) polyethylene. Given the component concentration ranges provided above, the glass-filled and non-glass filled compositions of the present invention each preferably contain from about 0.1 to about 3.0 parts by weight high density polyethylene. High density polyethylene is most preferably present in each of these compositions in an amount in the range of from about 0.5 to about 1.5 parts by weight.

The inventive composition can also contain other additives such as fillers, pigments, stabilizers, softeners, extenders, and the like.

The ingredients of the inventive composition can be combined using any one of several well known mixing techniques. For example, the components of the inventive composition can be mixed at room temperature in a rotating drum blender or, if more intensive mixing is desired, in a Henschel mixer. The resulting mixture is preferably extrusion compounded at a temperature above the melting point of the PAS resin in order to form a uniform blend.

Electronic components and other useful articles can be molded from the inventive composition using generally any thermoplastic molding technique. Well known examples include injection molding and compression molding.

Alternatively, electronic components and other articles can be molded from the inventive composition using generally any thermoplastic encapsulating technique. In one technique, for example, the article which is to be encapsulated (e.g., an electronic component) is positioned inside an injection mold. The inventive composition, which has been heated to a temperature above the melting point of the PAS resin, is then injected into the injection mold.

The following example is provided in order to further illustrate the present invention.

EXAMPLE I

As shown in Table I, two test compositions were prepared. The first composition (Composition contained 33 parts by weight (pbw) poly(phenylene sulfide) (PPS), 20 pbw glass fiber, 46 pbw talc, 1 pbw high density polyethylene (HDPE), and 0 pbw hindered phenol. The second composition (Composition 2) contained 33 pbw PPS, 20 pbw glass fiber, 45 pbw talc, 1 pbw HDPE, and 1 pbw hindered phenol.

Each test composition was mixed in a Henschel mixer until its components were completely dispersed. Each test mixture was then extruded and pelletized. Subsequently, the pelletized test compositions were injection molded to form test specimens.

Compositions 1 and 2 were tested in order to compare their mechanical and electrical properties. The specific electrical parameters tested were insulation resistance, arc resistance, and comparative tracking index (CTI).

The comparative insulation resistances of Compositions 1 and 2 were determined using the Bell insulation test. The Bell insulation test provides an indication of a composition's relative insulating strength in high temperature and high humidity environments. In the Bell test, the electrical resistance of a test specimen is measured after the specimen has been exposed to hot and humid conditions for an extended period of time. In testing Compositions 1 and 2, test specimens were placed in a salt-slurry humidity chamber for a period of 48 hours. During these exposure periods, the salt-slurry chamber was maintained at a temperature of 90° C. and a relative humidity of 95%.

The arc resistances of Compositions 1 and 2 were determined according to ASTM D495. The arc resistance of a test specimen provides an indication of the specimen's ability to resist the action of a high voltage, low current arc placed close to the specimen's surface. The high voltage, low current arc tends to either (a) promote the formation of a conducting path in the specimen material or (b) cause the material to become conducting due to thermal and chemical decomposition and erosion. In the arc resistance test, the interval between arc flashes is reduced at increasing current strengths until specimen failure occurs. Specimen failure is indicated by specimen ignition or by the disappearance of the arc.

As discussed above, the comparative tracking index (CTI) test provides an indication of a specimen's ability to perform as an insulating material under wet and contaminated conditions. In each CTI test, the platinum electrodes of a Beckman Insulation Tracking Set, Model DT-1 were placed on the surface of the test specimen. A voltage differential was then established between the electrodes while an ammonium chloride solution (i.e., 0.5 g ammonium chloride in 500 ml distilled water) was slowly dripped onto the specimen. The CTI of the test specimen was established by the maximum voltage at which, as measured in five consecutive tests, more than 50 drops of solution could be applied to the specimen before tracking occurred. Specimen tracking is indicated by a sudden surge in electrical current accompanied by a drop in voltage.

TABLE I

TEST COMPOSITIONS AND RESULTS

| COMPONENTS | COMPOSITION (PBW)[1] | |
|---|---|---|
| | 1 | 2 |
| Poly(phenylene sulfide) | 33[2] | 33[2] |
| glass fiber[3] | 20 | 20 |
| talc[4] | 46 | 45 |
| HDPE[5] | 1 | 1 |
| Hindered Phenol[6] | — | 1 |
| TEST PARAMETERS | TEST RESULTS | |
| Tensile strength[7] (psi) | 9500 | 10200 |
| Flexural modulus[8] (ksi) | 2.35 | 2.35 |
| Flexural strength[9] (psi) | 13700 | 13700 |
| Insulation resistance[10] (ohms) | $5.3 \times 10^8$ | $6.3 \times 10^7$ |
| Arc resistance[11] (seconds) | 208 | 203 |
| CTI[12] (volts) | 300 | 325 |

[1]parts by weight
[2]20 phw Phillips RYTON ® FS-5 and 13 phw Phillips RYTON ® FS-1.
[3]Owens Corning 497-DB
[4]Talc 2620
[5]MARTEX ® high density polyethylene, Phillips Petroleum Co.
[6]IRGANOX ® MD-1024, Ciba-Geigy Co. (N,N'-bis[3-(3',5'-di-tert-butyl-4-hydroxy-phenyl)]propanyl-hydrazine).
[7]ASTM D638
[8]ASTM D790
[9]ASTM D790
[10]Bell insulation resistance test. Insulation resistance is measured after 48 hours in a salt slurry humidity chamber at 90° C. and 95% relative humidity.
[11]ASTM D495
[12]Comparative tracking index. Measured using a Beckman Insulation Tracking Set, Model DT-1 with platinum electrodes. Tests were conducted using a solution of 0.5 g ammonium chloride in 500 ml of distilled water.

As indicated in Table I, the addition of a small amount of hindered phenol to a talc-containing PAS composition substantially and unexpectedly improves the composition's comparative tracking performance. As also shown in Table I, the presence of a small amount of hindered phenol does not adversely affect the composition's mechanical properties and arc resistance. Although the addition of hindered phenol reduced the composition's insulation resistance rating, the composition's insulation resistance rating remained quite high. Consequently, since it is the comparative tracking performance of PAS compositions which currently limits their use in insulating applications, the present invention significantly improves the usefulness of PAS compositions as insulating materials.

Thus, the present invention is well adapted to carry out the objects and obtain the ends and advantages mentioned above as well as those inherent therein. While presently preferred embodiments have been described for purposes of this disclosure, numerous changes will be apparent to those skilled in the art. Such changes are encompassed within the spirit of the invention as defined by the appended claims.

What is claimed is:

1. A poly(arylene sulfide) composition comprising: poly(arylene sulfide) resin; talc; and N,N'-bis[3-(3', 5'-di-tert-butyl-4-hydroxyphenyl)] propanyl hydrazine, wherein said N,N'-bis[3-(3',5'-di-tert-butyl-4-hydroxyphenyl)] propanyl hydrazine is present in said composition in an amount sufficient to increase the comparative tracking index (CTI) rating of said composition.

2. The composition of claim 1 wherein at least about 90% of the repeating units of said poly(arylene sulfide) resin are unsubstituted p-phenylene sulfide repeating units.

3. The composition of claim 1 wherein: said poly(arylene sulfide) resin is present in an amount in the range of from about 30 to about 60 parts by weight; said talc is present in an amount in the range of from about 25 to about 60 parts by weight; and said N,N'-bis[3'-(3',5'-di-tert-butyl-4-hydroxyphenyl)] propanyl hydrazine is present in an amount in the range of from about 0.5 to about 3.0 parts by weight.

4. The composition of claim 3 further comprising glass fiber in an amount in the range of from about 10 to about 50 parts by weight.

5. The composition of claim 4 wherein: said poly(arylene sulfide) resin is present in an amount in the range of from about 40 to about 50 parts by weight; said talc is present in an amount in the range of from about 40 to about 50 parts by weight; said N,N'-bis[3-(3', 5'-di-tertbutyl-4-hydroxyphenyl)] propanyl hydrazine is present in an amount in the range of from about 0.5 to about 1.5 parts by weight; and said glass fiber is present in an amount in the range of from about 15 to about 25 parts by weight.

6. The composition of claim 4 further comprising high density polyethylene in an amount in the range of from about 0.1 to about 3.0 parts by weight.

7. A poly(arylene sulfide) composition comprising:
   (a) poly(arylene sulfide) resin, at least about 90% of the repeating units of said poly(arylene sulfide) resin being unsubstituted p-phenylene sulfide repeating units;
   (b) talc;
   (c) glass fiber; and
   (d) N,N'-bis(3',5'-di-tert-butyl-4-hydroxyphenyl)]-propanyl hydrazine, wherein said N,N'-bis[3-(3',5'-di-tert-butyl-4-hydroxy-phenyl)] propanyl hydrazine is present in said composition in an amount sufficient to increase the CTI rating of said composition.

8. The composition of claim 7 wherein: said poly(arylene sulfide) resin is present in an amount in the range of from about 30 to about 60 parts by weight; said talc is present in an amount in the range of from about 25 to about 60 parts by weight; said glass fiber is present in an amount in the range of from about 10 to about 50 parts by weight; and said N,N'-bis[3-3',5'-di-tert-butyl-4hydroxyphenyl)] propanyl hydrazine is present in an amount in the range of from about 0.5 to about 3.0 parts by weight.

9. The composition of claim 8 further comprising high density polyethylene in an amount in the range of from about 0.1 to about 3.0 parts by weight.

10. The composition of claim 9 wherein: said poly(arylene sulfide) resin is present in an amount in the range of from about 40 to about 50 parts by weight; said talc is present in an amount in the range of from about 40 to about 50 parts by weight; said N,N'-bis[3-(3',5'-di-tert-butyl-4-hydroxyphenyl)] propanyl hydrazine is present in an amount in the range of from about 0.5 to about 1.5 parts by weight; and said glass fiber is present in an amount in the range of from about 15 to about 25 parts by weight.

11. A method of improving the CTI rating of a poly(arylene sulfide) resin composition comprising the step of adding an amount of talc and an amount of N,N'-bis[3-(3',5'-di-tert-butyl-4-hydroxyphenyl)] propanyl hydrazine to said composition such that said composition comprises from about 30 to about 60 parts by weight poly(arylene sulfide) resin, from about 25 to about 60 parts by weight of said talc, and from about 0.5 to about 3.0 parts by weight of said N,N'-bis[3-(3', 5'-di-tert-butyl-4-hydroxy-phenyl)] propanyl hydrazine.

12. The method of claim 11 wherein said composition further comprises glass fiber in an amount in the range of from about 10 to about 50 parts by weight.

13. The method of claim 11 wherein said composition further comprises high density polyethylene in an amount in the range of from about 0.1 to about 3.0 parts by weight.

14. The method of claim 11 wherein at least about 90% of the repeating units of said poly(arylene sulfide) resin are unsubstituted p-phenylene sulfide repeating units.

15. The method of claim 14 wherein said talc and said N,N'-bis[3-(3',5'-di-tert-butyl-4-hydroxy-phenyl)] propanyl hydrazine are added to said composition in amounts such that said composition comprises from about 40 to about 50 parts by weight of said poly(arylene sulfide) resin, from about 40 to about 50 parts by weight of said talc, and from about 0.5 to about 1.5 parts by weight of said N,N'-bis[3-(3',5'-di-tert-butyl-4-hydroxy-phenyl)] propanyl hydrazine.

16. The method of claim 15 wherein said composition further comprises glass fiber in an amount in the range of from about 15 to about 25 parts by weight.

17. The method of claim 16 wherein said composition further comprises high density polyethylene in an amount in the range of from about 0.1 to about 3.0 parts by weight.

* * * * *

UNITED STATES PATENT AND TRADEMARK OFFICE
CERTIFICATE OF CORRECTION

PATENT NO. : 5,175,200

DATED : December 29, 1992

INVENTOR(S) : Nathaniel Harry, Sr.

It is certified that error appears in the above-identified patent and that said Letters Patent is hereby corrected as shown below:

Col. 4, line 39, change "molded" to --encapsulated--.

Col. 4, line 52, change "(Composition contained" to --(Composition 1) contained--.

Signed and Sealed this

Sixteenth Day of November, 1993

*Attest:*

BRUCE LEHMAN

*Attesting Officer*  Commissioner of Patents and Trademarks